US007819561B2

(12) United States Patent
Puglisi

(10) Patent No.: US 7,819,561 B2
(45) Date of Patent: Oct. 26, 2010

(54) RETRACTABLE LIGHT FIXTURE

(76) Inventor: Daniel G. Puglisi, 350 Lake Kathryn Cir., Casselberry, FL (US) 32707

( * ) Notice: Subject to any disclaimer, the term of this patent is extended or adjusted under 35 U.S.C. 154(b) by 0 days.

(21) Appl. No.: 11/901,994

(22) Filed: Sep. 21, 2007

(65) Prior Publication Data

US 2009/0080204 A1 Mar. 26, 2009

(51) Int. Cl.
*B60Q 1/076* (2006.01)

(52) U.S. Cl. ...................................... 362/371; 362/386

(58) Field of Classification Search ................. 362/371, 362/386
See application file for complete search history.

(56) References Cited

U.S. PATENT DOCUMENTS 3,341,758 A * 9/1967 Plumpe, Jr. ................. 318/762
4,121,478 A 10/1978 Trenkler
4,320,441 A 3/1982 Matsushiro
4,567,547 A 1/1986 Alie et al.
4,630,179 A 12/1986 Yukimoto et al.
4,785,382 A 11/1988 Fukura et al.
5,075,834 A 12/1991 Puglisi
5,124,902 A 6/1992 Puglisi
2006/0133096 A1 * 6/2006 Corbett et al. .............. 362/371

* cited by examiner

*Primary Examiner*—David V Bruce
(74) *Attorney, Agent, or Firm*—William M. Hobby, III

(57) ABSTRACT

A retractable light fixture apparatus has a fixture housing for mounting in or to the wall of a building or under the eave of a building. A lamp housing and lamp is hinged to the fixture housing and is movable from a closed to an open position by an electric motor and from an open to a closed position by a gas spring. An electric brake holds the lamp housing in an open position against the gas spring whenever electric power is applied thereto.

9 Claims, 2 Drawing Sheets

RETRACTABLE LIGHT FIXTURE

BACKGROUND OF THE INVENTION

This invention relates to light fixtures and particularly to a wall mounted light fixture having a lamp movable between an open and a closed position.

The use of exterior lighting for residential and commercial applications in the U.S. and other parts of the world is extremely popular. Exterior lighting is used for safety, recreational, aesthetics, and decorative reasons. Site lighting and perimeter lighting is standard practice for all new construction. Many municipalities have building codes that require a minimum light level for commercial retail buildings. One of the most common types of light fixtures used in exterior site and perimeter applications is the wall mounted style also known as "Wallpacks". There are currently two basic configurations of wallpack light fixtures. There is the surface mounted and the semi-recessed mounted. Although both styles of light fixtures can illuminate the perimeter or site of a building, neither have all the advantages of a completely sealed and fully recessed retractable light fixture. The fully retractable light fixture blends into the architecture much better than a surface mount/box style lighting fixture. Surface mounted fixtures are often unsightly and can be exposed to vandalism during the daylight hours. The retractable light fixture is completely closed and sealed during the daylight hours which provides a better look and vandal resistant benefits. The retractable light fixture can also produce better photometrics than a semi-recessed fixture because the lamp compartment retracts completely out of its recessed housing. Semi-recessed wallpacks typically shine the light straight out which often produces ineffective lighting. Furthermore, semi-recessed light fixtures have their lenses completely exposed during daylight hours which is unsightly and subject to damage.

In my prior art U.S. Pat. Nos. 5,075,834 and 5,124,902 I provide retractable light fixtures mounted in a housing positioned in the ground and having a cover with a solenoid actuated lamp to move a retractable lamp from a retracted to an extended position. A retractable reading light is shown in the Alie et al. U.S. Pat. No. 4,567,547 for an air and light utility assembly. Retractable vehicle lamp assemblies can be seen in the Yukimoto et al. U.S. Pat. No. 4,630,179 for a retractable lamp which includes a lamp pivotally held on an axis to be extended and retracted into a housing and in the similar Fukura et al., U.S. Pat. No. 4,785,382, for a retractable lamp device for vehicles. The Trenkler U.S. Pat. No. 4,121,478 is a retractable headlamp for motor vehicles while the Matsushiro U.S. Pat. No. 4,320,441 is a retractable headlight for a radio controlled toy vehicle.

The present invention is directed towards a retractable light fixture which can be mounted onto the side of an interior or exterior wall or in a wall, such as between the studs of a building wall, or in the soffit of a roof. The retractable light fixture allows the lamp to be opened by actuating a switch to apply power to the light fixture. Switching on the electric power both opens the lamp housing, turns on the lamp, and then holds the lamp in place with an electromagnetic brake. Switching off the power allows the electromagnetic brake to disengage, turns off the lamp and allows the housing to close.

SUMMARY OF THE INVENTION

A retractable light fixture apparatus has a fixture housing for mounting to or in an interior or exterior wall of a building or in the soffit of a building eave. A lamp housing is hinged to the fixture housing and is movable between closed and opened positions and contains an electric lamp therein. An AC electric motor drive is in the lamp housing and is operatively attached to the fixture housing to move the lamp housing from the closed to the open position. Biasing means, such as a gas spring, biases the lamp housing from its open to its closed position when switching off the power to the light fixture. An electric power source is connected to the electric motor to actuate the electric motor. An electromagnetic brake holds the lamp housing in an open position against the air spring and operates by cutting off the AC electric power to the electric motor and applying a DC electric source to the motor. A microswitch connects the electric power source to the electric motor in a first position and deactivates the electric motor in a second position and at the same time connects the DC electric power to the electric motor to lock the motor shaft. The electromagnetic brake merely applies a DC voltage to the AC motor which locks the AC motor shaft and the electric lamp in its open position. Thus, an AC electric light fixture actuates an AC electric motor upon receiving electric power to open the lamp housing and then holds the lamp housing open with the electro-magnetic brake and with the lamp turned on until electric power to the electric fixture is turned off. The fixture housing has a center open portion adapted for the lamp housing to fit thereinto in a closed position. The light fixture includes a gear box operatively connected-to the electric motor having an output shaft therefrom. A microswitch is moved from the first position to the second position by a switch arm aligned with a cam on the gear box output shaft for moving the switch between the first position and a second position by the rotation of the output shaft driving the cam against the switch arm. The gear box output shaft is connected to the fixture housing with a gas cylinder which rotates and closes the lamp housing when the electric power is turned off. The lamp housing opening can be varied by adjusting a coupling to the gear box output shaft to vary the position on the shaft relative to the cam.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
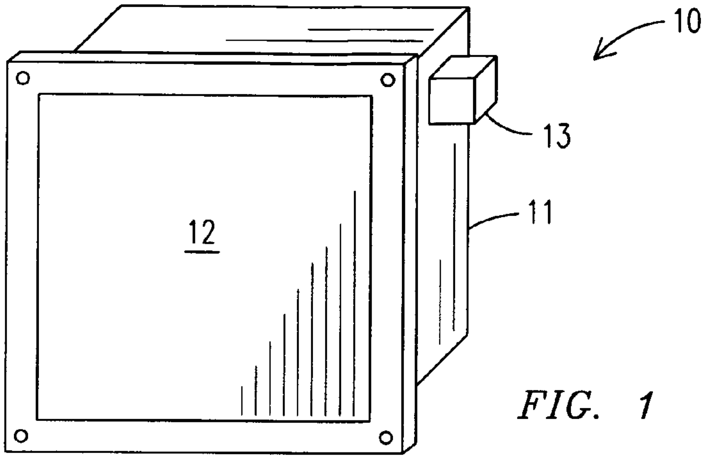
FIG. 1 is a perspective view of a retractable light fixture in accordance with the present invention having the lamp housing in a closed position.
Figure 2:
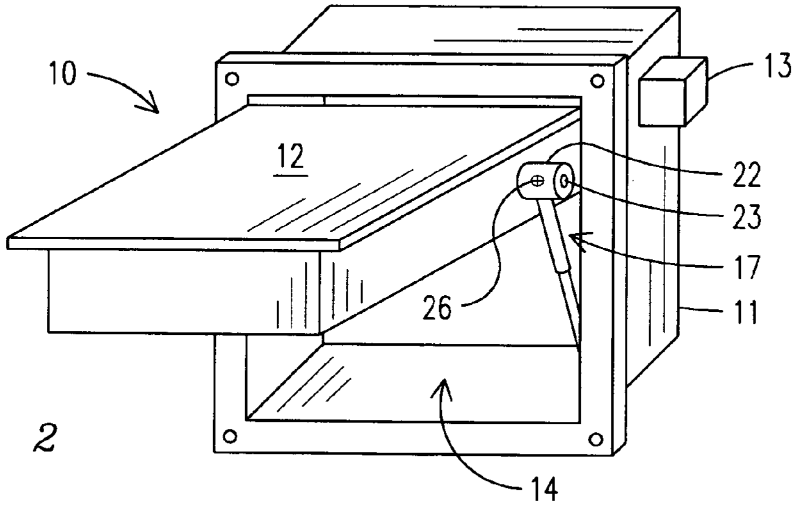
FIG. 2 is a perspective view of a retractable light fixture of FIG. 1 having the lamp housing in an open position.
Figure 3:
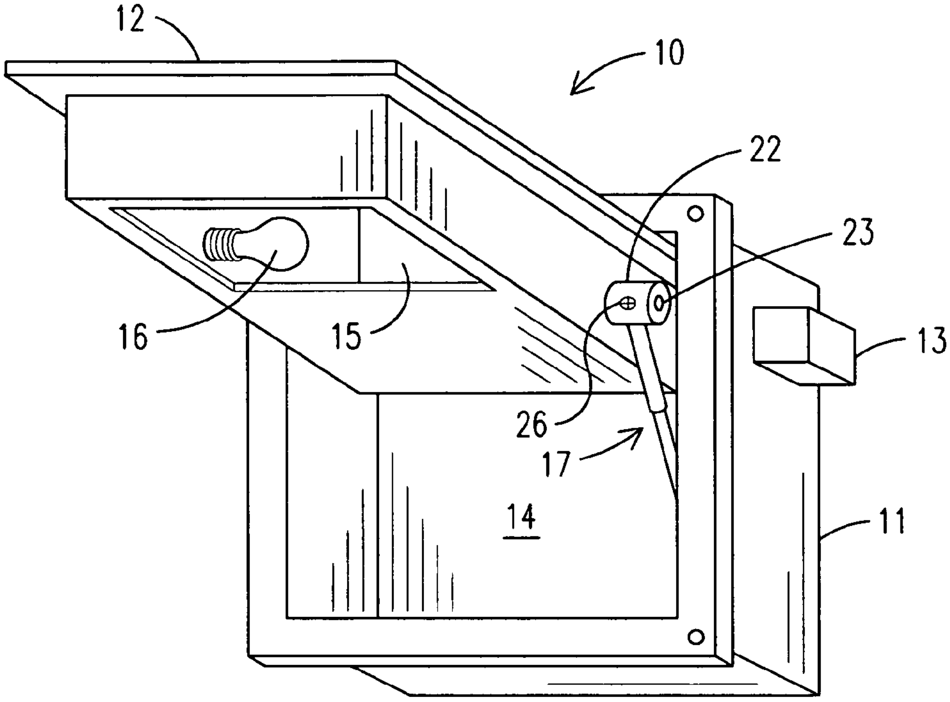
FIG. 3 is a perspective view of a retractable light fixture of FIGS. 1 and 2 having a lamp housing open to a different position.

Referring to the drawings and especially to FIGS. 1 through 3, a light fixture 10 has a fixture housing 11 and a lamp housing 12 and is shown with a wiring J-box 13. The lamp housing 12 is shown in the closed position in the main fixture housing 11 in FIG. 1 and in an open position in FIGS. 2 and 3. The fixture housing 11 has an open space 14 therein. The lamp housing while housing 12 is shown open to a higher position in FIG. 3 so that you can see the lamp housing lens 15 having a lamp 16 mounted therein. The fixture 10 is ideally suited for placing on the side of a wall or, in the embodiment illustrated, built into a wall in which the sides of the housing 11 will fit between the spacing of the studs in a building wall. The lamp fixture can also fit into the soffit of the eave of a building. The lamp housing 12 is readily adjustable to open to any angle desired, such as that shown in FIG. 2 and again in FIG. 3.

Figure 4:
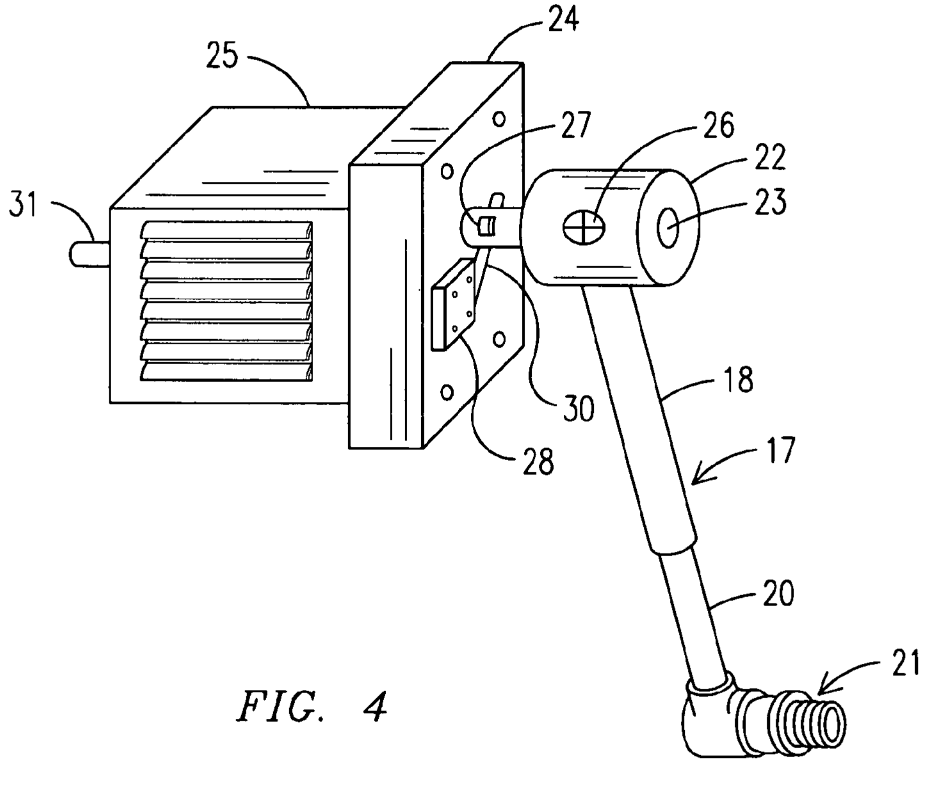
FIG. 4 is a perspective view of a drive system for opening the light fixtures of FIGS. 1 through 3.

The opening and closing of the lamp housing 12 is better illustrated in connection with FIGS. 2, 3 and 4 in which a gas spring 17 has a gas cylinder 18 and an extending rod 20. Extending rod 20 has a coupling 21 for attaching to the main fixture housing 11 while the gas cylinder 18 is connected to a spring coupling 22 which is attached to a gear motor shaft 23 extending from the gear box 24 and electric motor 25. The gas spring coupling 22 can have its position on the shaft 23 adjusted by loosening a set screw 26 and rotating it to two different positions relative to the shaft 23. The cylinder 18 is connected to the spring coupling by a flexible connections so that the rotation of the coupling 22 rotates and pulls the gas spring 17 to different positions, depending upon where the coupling 22 is locked to the shaft 23.

Gear box 24 shaft 23 has a cam 27 attached thereto and a microswitch 28 is attached to the side of a gear box 24. Microswitch 28 has a switch arm 30 extending therefrom leaning against the shaft 23. As the motor 25 is powered to turn the gear box 24 shaft 23, it rotates to a position where the cam 27 hits the microswitch arm 30 to activate the microswitch. The gear motor armature 31 is seen protruding from the AC electric motor 25.

In operation, the AC electric motor 25 is actuated by turning on the electric power with a switch or by a timer clock or a photocell or motion detector as desired which starts the shaft 23 rotating until the cam 27 actuates the microswitch arm 30 and actuates the microswitch 28 which cuts off the power to the electric motor 25 with the shaft 23 in the position determined by of the cam 27. This opens the lamp housing 12 from a closed position, as seen in FIG. 1, to an open position, as seen in FIGS. 2 or 3, against the gas spring biasing means 17. When the electric power to the fixture is cut, the gas spring 17 pulls the spring coupling 22 and shaft 23 to pull against the lamp housing 12 to close the lamp housing. The lamp fixture of the present invention includes an electromagnetic brake, as hereinafter described, which locks the shaft 23 against movement to prevent the lamp housing from closing once it reaches its open position and the lamp is turned on.

Figure 5:
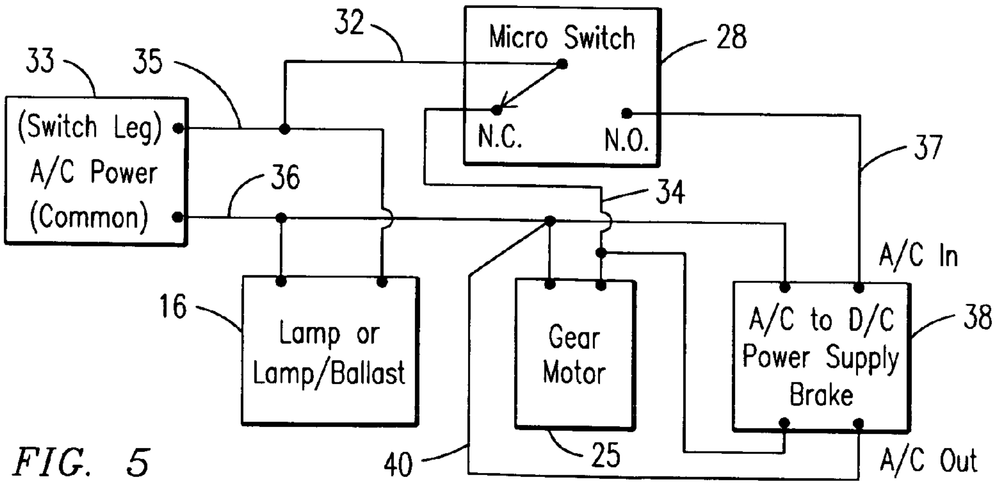
FIG. 5 is a block diagram of the operation of the circuitry of the light fixtures of FIGS. 1 through 3.

Turning to FIG. 5, a block diagram of the circuit of the present light fixture is illustrated in which a source of AC electric power 33 is connected through a line 32 to a microswitch 28. The microswitch 28 is normally in a normally closed position, as illustrated, and directs the hot line 32 of the AC power through the line 34 to the gear motor 25. The hot line 35 is also connected to the lamp 16 to activate the lamp. Common line 36 is connected to the lamp and to the gear motor 25. An AC motor 25 rotates the shaft 23 until the cam 27 of FIG. 4 hits the microswitch 28 switching the microswitch 28 to the normally open position thereby cutting off the AC power from the line 34 to the gear motor 25. Then the AC power in line 32 is switched from the AC electric motor 25 through a line 37 to a DC power supply 38 which immediately puts a DC power source through the line 40 directly to the gear motor 25. Gear motor 25 is an AC motor in which AC power has been disconnected and a DC voltage applied thereto. The AC motor is locked up by the DC voltage and forms an electromagnetic brake. The shaft 23 is locked in position which has the lamp housing in an open position. The DC power supply 38 stays on as long as there is AC power and the power source 31 is connected through the microswitch 28 which also maintains the lamp 16 turned on. The power supply from 33 is switched with a manual switch or a photocell or a timer or the like to turn the power off and disconnect the lamp 16 and the DC power source 38 which releases the gear motor 25 armature 31 from the shaft 23 allowing the gear springs 17 to return the lamp housing 12 back to its closed position until the AC power is again switched on.

Thus, the sequence of events would be where there is no power through the AC power switch 33 and the lamp housing is closed, as in FIG. 1. When the switch 33 is turned on, the gear motor and lamp power are turned on and the gear motor turns until the microswitch 28 is activated. The microswitch turns off the AC power to the gear motor 25 and turns on the power to the DC power supply 38, which applies a DC power to the gear motor 25 and freezes the gear motor armature into an open position for the lamp fixture. When the switch 33 is turned off to disconnect the AC power, the unit closes under the gas spring and the lamp is turned off.

It should be clear that a lamp fixture has been provided which is merely switched on or off to open the lamp fixture, turn on the lamp, and to hold it in an open position until it is closed by a biasing means. A biasing means can be a gas spring, as illustrated, or a torsion spring or by the gravity of the lamp housing. However, the use of a gas spring, or the like, with an easily adjustable coupling to a gear box output shaft allows for a quick adjustment to different positions of the lamp housing opening. However, it should be clear that other forms and embodiments are considered within the scope of the present invention and the forms shown are to be considered illustrative rather than restrictive.

I claim:

1. A retractable light fixture comprising:

a fixture housing;

a lamp housing hinged to said fixture housing and movable between closed and open positions;

an electric lamp mounted in said lamp housing;

biasing means for biasing said lamp housing from an open to a closed position;

an AC electric motor drive mounted in said lamp housing and operatively attached to said fixture housing to move said lamp housing from a closed to an open position against said biasing means;

an AC electric power source connected to said electric motor to actuate said electric motor;

an electromagnetic brake for holding said lamp housing in an open position when activated by a DC power source; and a micro-switch connecting said electric power source to said electric motor in a first position and deactivating said electric motor and activating said electric brake and said electric lamp in a second position;

whereby an electric light fixture actuates an electric motor upon receiving electric power to open said lamp housing and holds said lamp housing open against said biasing means and said lamp turned on until electric power to said lamp fixture is turned off.

2. The retractable light fixture in accordance with claim 1 in which said electric motor is an AC electric motor and said electro-magnetic brake operates by applying DC power to the AC electric motor when the AC power to the electric motor is turned off thereby locking the AC motor in place until power to the electric light fixture is turned off disabling the electro-magnetic brake and lamp and allowing the biasing means to return the lamp fixture to a closed position.

3. The retractable light fixture in accordance with claim 1 in which said fixture housing has a center opening portion adapted for said lamp housing to fit into when said lamp housing is closed.

4. The retractable light fixture in accordance with claim 1 in which said biasing means is a gas spring forming a link between said electric motor and said fixture housing.

5. The retractable light fixture in accordance with claim 4 including a gear box operatively connected to said electric motor and having an output shaft therefrom.

6. The retractable light fixture in accordance with claim 5 in which said biasing means is a gas spring movably attached to said fixture housing at one end and movably attached to said gear box output shaft at the other end thereof.

7. The retractable light fixture in accordance with claim 6 in which said micro-switch is moved from a first position to a second position by a switch arm aligned with a cam on said gear box output shaft for moving said switch between said first position and said second position by the rotation of said output shaft cam against said switch arm.

8. The retractable light fixture in accordance with claim 6 in which said gear box output shaft has an adjustable gas spring coupling attached thereto.

9. The retractable light fixture in accordance with claim 8 in which said gas spring coupling is rotatably adjustable on said gear box output shaft to vary the position of said cam on said gear box output shaft to vary the opening position of the lamp housing when said electric motor is activated.

* * * * *